Figure 1:
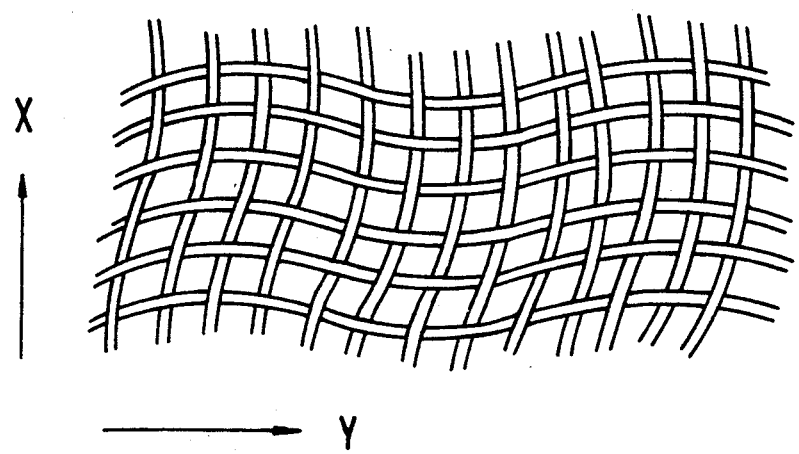

United States Patent
Barrenscheen et al.

[11] Patent Number: 5,178,408
[45] Date of Patent: Jan. 12, 1993

[54] GAS BAG FOR AIRBAG SYSTEMS

[75] Inventors: Frank Barrenscheen, Grossostheim; Martin Kreuzer, Kleinwallstadt, both of Fed. Rep. of Germany

[73] Assignee: Kolbenschmidt Aktiengesellschaft, Neckarsulm, Fed. Rep. of Germany

[21] Appl. No.: 689,381

[22] Filed: Apr. 22, 1991

[30] Foreign Application Priority Data

Apr. 25, 1990 [DE] Fed. Rep. of Germany ....... 4013207
Aug. 21, 1990 [DE] Fed. Rep. of Germany ....... 4026374

[51] Int. Cl.⁵ ............................................. B60R 21/16
[52] U.S. Cl. .................................. 280/728; 280/743; 139/383 R
[58] Field of Search ............... 280/728, 743; 383/107, 383/109; 139/383 R

[56] References Cited

U.S. PATENT DOCUMENTS

| | | |
|---|---|---|
| 3,842,583 | 10/1974 | Gage . |
| 3,888,504 | 6/1975 | Bonn et al. ........................ 280/743 |
| 3,892,425 | 7/1975 | Sakairi et al. . |
| 3,937,488 | 2/1976 | Wilson et al. ..................... 280/743 X |
| 4,559,975 | 12/1985 | Stits . |
| 4,921,735 | 5/1990 | Bloch ............................... 280/743 X |
| 5,011,183 | 4/1991 | Thornton et al. ............... 280/728 X |
| 5,071,161 | 12/1991 | Mahon et al. ................... 280/743 X |

FOREIGN PATENT DOCUMENTS

| | | | |
|---|---|---|---|
| 974745 | 9/1975 | Canada . | |
| 314867 | 5/1989 | European Pat. Off. . | |
| 2133704 | 11/1971 | Fed. Rep. of Germany . | |
| 3644554 | 9/1988 | Fed. Rep. of Germany . | |
| 171361 | 7/1990 | Japan .......................... | 280/728 |
| 2-220944 | 9/1990 | Japan .......................... | 280/728 |
| 2-279441 | 11/1990 | Japan .......................... | 280/743 |

*Primary Examiner*—Robert P. Olszewski
*Assistant Examiner*—Boris Milef
*Attorney, Agent, or Firm*—Sprung Horn Kramer & Woods

[57] ABSTRACT

In an automotive vehicle provided with an inflatable gas bag for protection of an occupant in the event of collision, the improvement wherein the bag is made of a plain-weave woven fabric of synthetic threads and having a top and a bottom, the woven fabric having a sett of 16 to 23 threads per cm, its threads having a denier of at most 470 dtex, low-shrinkage threads being in the bottom of the gas bag and extensive thread being in the top of the gas bag.

9 Claims, 1 Drawing Sheet

GAS BAG FOR AIRBAG SYSTEMS

This invention relates to a gas bag which is intended for use in air bag systems and is made of a plain-weave woven fabric of synthetic threads.

In case of a head-on collision or in case of accidents in which the impact directions include only a small angle (<+/−30°), which accidents presently account for more than 60% of all accidents so that they constitute the most frequent kind of accidents, and in case of collisions at velocities in excess of 18 kg/h protection will be afforded by an air bag system which is accommodated in the front part and/or in the passenger compartment of passenger cars. An impending impact on a massive obstacle will cause the velocity sensors of the airbag system to respond, and after an initial contact (at the time T=0 ms) the occupant of the vehicle will begin to slip forward with a delay, which is due to the inertia of the moving mass of the occupant. After 10 ms the gas bag begins to be inflated because the igniting current has been caused to flow through the detonator of the gas generator and the detonator has then ignited the primer pellet and also the explosive charge. When the gas has been purified and cooled, it enters the gas bag. After 40 to 50 ms the upper part of the body of the occupant impinges on the gas bag, which has fully been inflated within about 30 ms. The gas bag is formed on its rear side with outlet openings, through which the gas escapes at an exactly defined rate so that the body of the occupant is cushioned gently and is not subjected to rebounding forces. That process results in the gas bag in pressures of 0.4 to 2.7 bars above atmospheric pressure.

A gas bag for air bag systems usually consists of a polyamide woven fabric, which is coated on the inside with butyl rubber to ensure that the woven fabric will be as gastight as is required. To ensure that the gas bag when it is folded together will remain operative for at least 10 years, talcum powder must be strawn on the inside surface of the gas bag so that the butyl rubber layer will not stick. In case of a collision, talcum particles and possibly also particles of the butyl rubber layer and particles formed by the combustion of the explosive charge are blown through the outlet openings of the gas bag into the passenger compartment and this will result in a considerable soiling of the passenger compartment and will constitute a nuisance to the occupants.

No talcum powder will be required if the inside surface of the gas bag is coated with a silicone layer. However in that case too it will be necessary to provide outlet openings on the rear side of the gas bag and particles produced by the combustion of the explosive charge and particles from the silicone layer can escape through such openings into the passenger compartment.

The solid particles escaping from the gas generator have a particle size of 3 to 9 μm and a particle size distribution which is in accordance with a Gaussian normal distribution.

More recently, EP-A-0 314 867 has disclosed for use in air bag systems a gas bag which consists of a woven fabric which is made of synthetic threads and has an overcrowded fabric construction. The woven fabric has been shrunk, and heat-set and has been calendered at a temperature between 60° and 250° C., under a pressure between 10,000 and 100,000 kg and at a speed of travel between 5 and 25 m/min. The woven fabric has a plain weave with 34 warp threads and 16 picks per cm and the warp and weft consist of threads having a denier of dtex 470. As a result of the shrinking, heat-setting and calendering treatments the woven fabric is overcrowded, i.e. it has been condensed to such a degree that it is virtually impermeable to gas so that there is no need to provide a coating on the inside surface of the woven fabric. However the shrinking, heat-setting and calendering treatments of the woven fabric often involve a considerable expenditure and the gas bags made of such woven fabric must be provided on the rear with outlet openings through which solid particles produced by the combustion of the explosive charge can escape into the passenger compartment of the motor vehicle.

It is an object of the present invention to provide for use in air bag systems a gas bag which is made of the woven fabric of the kind described hereinabove and in which the solid particles produced by the combustion of the explosive charge of the gas generator will be retained.

That object is accomplished by employing a woven fabric which has a sett of 16 to 23 threads per cm and woven of threads which have a denier not in excess of 470 dtex and consist of low-elongation threads in the bottom part of the gas bag and of high elongation threads in the top part of the gas bag.

According to a further feature the woven fabric of the bottom part of the gas bag has a sett of 16 to 18.5 threads per cm, and the woven fabric of the top part of the gas bag has a sett of 21 to 23.5 threads per cm.

As the gas bag is inflated by the explosive charge which has been ignited, the threads of the woven fabric are stretched so that the woven fabric is initially rendered perfectly impermeable to the solid particles produced by the combustion of the explosive. When the gas bag has been inflated the woven fabric is stretched to a defined extent by the gas pressure so that interstices are formed between adjacent threads and permit an exactly defined flow of the gas out of the gas bag when the occupant of the vehicle has impinged on the bag. As a result, the upper part of the body of the occupant will then lie on the gas bag and will be cushioned gently and without being subjected to strong rebounding forces.

In dependence on the volume of the unfolded gas bag the permeability of the woven fabric to gas can be selected to amount to 30 to 80 liters per $dm^2$-min under a vacuum of 5 mbars in adaptation to the type of the motor vehicle by a selection of a proper sett of the woven fabric.

According to a special feature of the gas bag the woven fabric of the bottom part of the gas bag has a sett of 17.5 warp threads per cm and 17.1 picks per cm and the woven fabric of the top part of the gas bag has a sett of 22.8 warp threads per cm and 20.8 picks per cm.

The synthetic threads of the top part of the gas bag have an elongation of 20 to 30%.

Alternatively, the upper part of the gas bag may consist of a woven fabric which has been shrunk, heat-set and calendered and has an overcrowded fabric construction.

The desired result will be produced in a particularly desirable manner by a gas bag in which the woven fabrics of the bottom and top parts of the gas bag extend at an angle of 45° to each other.

The two parts of the gas bag are joined by stitching or fusion.

Figure 2:
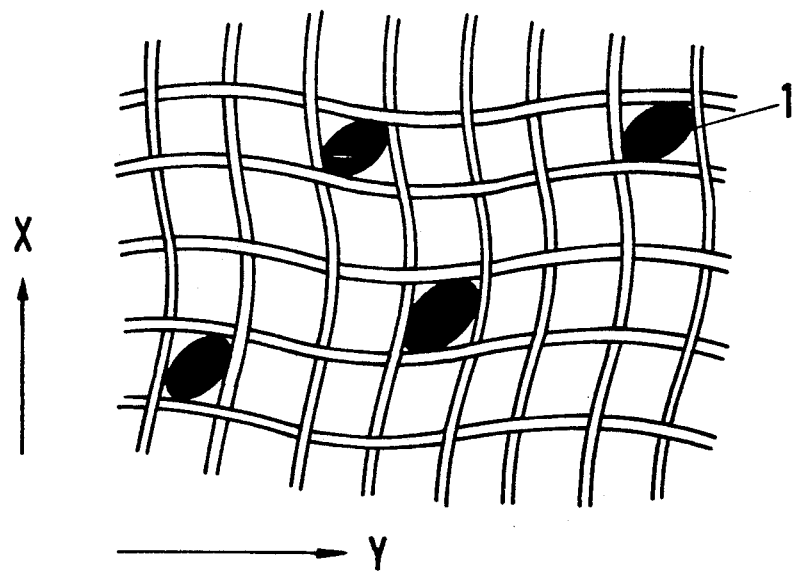

The invention is shown by way of example in drawing wherein:

FIG. 1 is an enlarged plan view of a fabric in accordance with the invention, as it appears in a gas bag prior to inflation, and FIG. 2 is a similar view after inflation of the gas bag.

FIG. 1 is a fragmentary view showing a portion of a woven fabric used in a gas bag. The fabric has a sett of 17.5 warp threads per cm (x-direction) and 17.1 picks per cm (Y-direction). All threads consist of polyamide and have a denier of 470 dtex. That woven fabric is used to make the bottom part of the gas bag and under a vacuum of 5 mbars has a permeability to gas amounting to 45 liters per dm$^2$-min.

FIG. 2 shows the woven fabric of the gas bag when the latter has been inflated. Solid particles 1 which have been produced by the combustion of the explosive charge of the gas generator have been caught in a part of the interstices between the threads of the woven fabric as the latter was stretched and the gas has been able to escape through the remaining interstices, so that preformed outlet openings for an escape of the gas will not be required in the gas bag.

It will be appreciated that the instant specification and claims are set forth by way of illustration and not limitation, and that various modifications and changes may be made without departing from the spirit and scope of the present invention.

What is claimed is:

1. In combination, an inflatable gas bag for use as protection for a passenger in a vehicle, and an explodable charge to inflate said gas bag, said explodable charge upon explosion producing gas and solid particles of predetermined sizes, said gas bag being made of a plain-weave woven fabric of synthetic threads and having a top and a bottom, the woven fabric having a sett of 16 to 23 threads per cm, its threads having a denier of at most 470 dtex, low-elongation threads being in the bottom of the gas bag and high elongation threads being in the top of the gas bag, inflation of said gas bag resulting in expansion of said bag with formation of interstices of sufficient size to permit escape of said gas but not of said solid particles.

2. A combination according to claim 1, wherein the woven fabric of the bottom of the gas bag has a sett of 16 to 18.5 threads per cm.

3. A combination according to claim 1, wherein the woven fabric of the bottom of the gas bag has a sett of 17.5 warp threads per cm and of 17.1 picks per cm.

4. A combination according to claim 1, wherein the woven fabric of the top of the gas bag has a sett of 21 to 23.5 threads per cm.

5. A combination according to claim 1, wherein the woven fabric of the top of the gas bag has a sett of 22.8 warp threads per cm and of 20.8 picks per cm.

6. A combination according to claim 1, wherein the threads of the top of the gas bag have an elongation of 20 to 30%.

7. A combination according to claim 1, wherein the woven fabric of the bottom of the gas bag extends at an angle of 45° to the woven fabric of the top of the gas bag.

8. A combination according to claim 1, wherein the threads are of polyamide.

9. In an automotive vehicle provided in combination with an inflatable gas bag for protection of an occupant in the event of collision and an explodable charge to inflate said gas bag, the improvement wherein explodable charge upon explosion producing gas and solid particles of predetermined sizes, said gas bag being made of a plain-weave woven fabric of synthetic threads and having a top and a bottom, the woven fabric having a sett of 16 to 23 threads per cm, its threads having a denier of at most 470 dtex, low-elongation threads being in the bottom of the gas bag and high elongation threads being in the top of the gas bag, inflation of said gas bag resulting in expansion of said bag with formation of interstices of sufficient size to permit escape of said gas but not of said solid particles.

* * * * *